US012491531B2

(12) United States Patent
Weng et al.

(10) Patent No.: US 12,491,531 B2
(45) Date of Patent: Dec. 9, 2025

(54) COATING DIE HEAD AND COATING MACHINE

(71) Applicant: CONTEMPORARY AMPEREX TECHNOLOGY (HONG KONG) LIMITED, Hong Kong (CN)

(72) Inventors: Zhirong Weng, Fujian (CN); Liang Jiang, Fujian (CN); Lei Lu, Fujian (CN); Shengwu Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 311 days.

(21) Appl. No.: 18/226,787

(22) Filed: Jul. 27, 2023

(65) Prior Publication Data

US 2024/0001397 A1 Jan. 4, 2024

Related U.S. Application Data

(63) Continuation of application No. PCT/CN2023/078693, filed on Feb. 28, 2023.

(30) Foreign Application Priority Data

Jun. 22, 2022 (CN) ......................... 202210709508.3

(51) Int. Cl.
*B05C 5/02* (2006.01)

(52) U.S. Cl.
CPC ................................. *B05C 5/0258* (2013.01)

(58) Field of Classification Search
USPC ................................................. 118/410, 300
See application file for complete search history.

(56) References Cited

U.S. PATENT DOCUMENTS

| | | | |
|---|---|---|---|
| 5,059,371 | A | 10/1991 | Saheki et al. |
| 5,320,679 | A | 6/1994 | Derezinski et al. |
| 2004/0139913 | A1 | 7/2004 | Kuromiya |
| 2012/0315378 | A1 | 12/2012 | Yapel et al. |
| 2015/0053133 | A1 | 2/2015 | Park et al. |

(Continued)

FOREIGN PATENT DOCUMENTS

| | | | | |
|---|---|---|---|---|
| CN | 203030461 U | | 7/2013 | |
| CN | 104117464 A | | 10/2014 | |
| CN | 107073506 A | * | 8/2017 | ......... B05C 11/1002 |

(Continued)

OTHER PUBLICATIONS

English Translation CN-109127261-A (Year: 2019).*

(Continued)

*Primary Examiner* — Yewebdar T Tadesse
(74) *Attorney, Agent, or Firm* — XSENSUS LLP

(57) ABSTRACT

A coating die head may comprise: a coating main body comprising a first die head and a second die head arranged separately, the first die head and the second die head being spliced to define an accommodating cavity, and opposite ends of the coating main body being respectively provided with a coating inlet and a coating outlet which are in communication with the accommodating cavity; and a turbulence assembly which defines a flow channel with a cavity wall of the accommodating cavity, the turbulence assembly being adjustably arranged in the accommodating cavity.

12 Claims, 4 Drawing Sheets

(56) References Cited

U.S. PATENT DOCUMENTS

2017/0333937 A1* 11/2017 Tanley .................. B05C 5/0254

FOREIGN PATENT DOCUMENTS

| | | | | |
|---|---|---|---|---|
| CN | 109127261 A | * 1/2019 | ............... | B05C 1/04 |
| CN | 113649230 A | 11/2021 | | |
| CN | 214917719 U | 11/2021 | | |
| CN | 215997336 U | 3/2022 | | |
| CN | 216064014 U | 3/2022 | | |
| JP | 2006-102598 A | 4/2006 | | |
| JP | 2009-273997 A | 11/2009 | | |
| JP | 2012-210606 A | 11/2012 | | |

OTHER PUBLICATIONS

International Search Report mailed on Jun. 5, 2023, received for PCT Application PCT/CN2023/078693, filed on Feb. 28, 2023, 6 pages including English Translation.

Extended European Search Report issued Oct. 11, 2024 in European Patent Application No. 23745374.1.

* cited by examiner

COATING DIE HEAD AND COATING MACHINE

CROSS-REFERENCE TO RELATED APPLICATIONS

The present application is a continuation of International Application No. PCT/CN2023/078693, filed Feb. 28, 2023, which claims priority to Chinese patent application no. 202210709508.3, filed on Jun. 22, 2022 and entitled "COATING DIE HEAD AND COATING MACHINE", each of which is incorporated herein by reference in its entirety.

TECHNICAL FIELD

The present application relates to the technical field of traction batteries, and more particularly to a coating die head and a coating machine.

BACKGROUND ART

Achieving energy conservation and emission reduction is the key to the sustainable development of the automotive industry. Electric vehicles have become an important part of the sustainable development of the automotive industry due to their advantages in energy conservation and environmental protection. For the electric vehicles, the battery technology is an important factor to their development.

In a process for battery preparation, extrusion coating is generally used to prepare electrode plates. In a process for battery generation, the consistency of cell capacity is a key parameter to evaluate the electric performance, and the consistency of battery capacity is determined by the consistency of coating weight.

In order to ensure the consistency of coating weight, it is necessary to control the extrusion velocity. Conventional coating devices cannot guarantee the consistency of extrusion velocity of slurries in a coating width direction during coating with various slurries, thus affecting the coating quality.

SUMMARY OF THE DISCLOSURE

In view of this, the present application discloses a coating die head and a coating machine.

In a first aspect, the present application provides a coating die head, comprising:

a coating main body comprising a first die head and a second die head arranged separately, the first die head and the second die head being spliced to define an accommodating cavity, and opposite ends of the coating main body being respectively provided with a coating inlet and a coating outlet which are in communication with the accommodating cavity; and a turbulence assembly which defines a flow channel with a cavity wall of the accommodating cavity, the turbulence assembly being adjustably arranged in the accommodating cavity.

According to the above arrangement, since the turbulence assembly is adjustably arranged in the accommodating cavity, the flow channel defined by the turbulence assembly and the cavity wall of the accommodating cavity varies with the adjustment of the turbulence assembly in the accommodating cavity so as to meet the requirement for coating with slurries of different viscosities. That is, when it is necessary to coat with a slurry of a different viscosity, the turbulence assembly is adjusted to change the flow channel to match the changed flow channel with the viscosity of the slurry, such that the flow resistance of the slurry in the flow channel is adjusted to adjust the distribution of extrusion velocity and thus ensure the consistency of extrusion velocity of the slurry of the different viscosity in a coating width direction through the coating outlet, thereby achieving the purpose of improving the product quality.

In some embodiments, the turbulence assembly has adjustable volume, shape and/or position; and/or the turbulence assembly is arranged in the accommodating cavity in a replaceable manner.

By means of adjusting the volume, shape and/or position of the turbulence assembly and/or allowing the turbulence assembly to be arranged in the accommodating cavity in a replaceable manner, the turbulence assembly defines different flow channels with the cavity wall of the accommodating cavity so as to meet the requirement for coating with slurries of different viscosities.

In some embodiments, the turbulence assembly comprises at least one turbulence member, which is arranged in the accommodating cavity in such a manner that the number of the turbulence member in the turbulence assembly is adjustable and/or the turbulence member has a variable shapes and/or an adjustable position.

By means of changing the number and/or shape of the turbulence member in the turbulence assembly and/or adjusting the position of the turbulence member, it is convenient for defining different flow channels with the cavity wall of the accommodating cavity, thereby ensuring that the extrusion velocity is uniform during coating with slurries of different viscosities.

In some embodiments, two or more turbulence members are provided; and each of the turbulence members comprises a turbulence base and at least one turbulence stack block, the turbulence base being fixed in the accommodating cavity, and the turbulence stack block being detachably connected to the turbulence base. By means of allowing one of the turbulence members in each turbulence assembly to serve as the turbulence base, it is convenient for the turbulence assembly to be fixed in the accommodating cavity and thus prevented from moving in the accommodating cavity under the pressure from the slurry during the slurry extrusion process, thereby further ensuring the consistency of extrusion velocity.

In some embodiments, the turbulence stack blocks are detachably connected to the turbulence base, and at least some of the turbulence stack blocks are located upstream and/or downstream of the turbulence base in a slurry movement direction. By means of allowing at least some of the turbulence stack blocks to be located upstream and/or downstream of the turbulence base in the slurry movement direction, it is convenient to adjust the length of the turbulence assembly in an arrangement direction, thereby ensuring the consistency of extrusion velocity.

In some embodiments, the turbulence base is of an I-shaped structure having two grooves for accommodating the turbulence stack blocks, the two grooves respectively facing the coating inlet and the coating outlet. In the case where the turbulence base is of an I-shaped structure, a web (a vertical plate that connects an upper horizontal plate and a lower horizontal plate) in the I-shape structure has a small size in the arrangement direction, and the turbulence stack blocks can be accommodated in the grooves on the two sides of the I-shaped structure, so that more turbulence stack blocks can be provided in the arrangement direction, thereby expanding the range of adjustment in the arrangement direction.

In some embodiments, the turbulence base abuts between the first die head and the second die head and is fixed. According to the above arrangement, the turbulence base can be fixed in the accommodating cavity under the abutting action of the first die head and the second die head, which omits the arrangement of additional components to fix the turbulence base in the accommodating cavity, so as to prevent the interference on the flow of slurry due to the arrangement of additional components in the accommodating cavity while simplifying the structure of the coating die head.

In some embodiments, the first die head has a first abutting face, and the second die head has a second abutting face spaced apart from the first abutting face; and the first abutting face and the second abutting face respectively abut with flat surfaces of two ends of the turbulence base. Since the first abutting face and the second abutting face respectively abut with the two end faces of the turbulence base in the arrangement direction, it is ensured that there is no gap between the two end faces of the turbulence base in a first direction and the die heads, so that the slurry can flow to the coating outlet only from two sides of the turbulence base in the coating width direction, which enhances the of flow blocking and dividing functions of the turbulence member.

In some embodiments, the accommodating cavity comprises a first portion and a second portion which are in communication with each other, the second portion being in communication with the coating inlet, the first portion being in communication with the coating outlet, the height of the first portion gradually decreasing from the end in communication with the second portion to the other end, and the turbulence base being fixed in the second portion; and/or the accommodating cavity comprises a second portion and a third portion which are in communication with each other, the third portion being in communication with the coating inlet, the second portion being in communication with the coating outlet, the height of the third portion gradually decreasing from the end in communication with the second portion to the other end, and the turbulence base being fixedly arranged in the second portion. According to the above arrangement, the turbulence base is fixed in the second portion, and due to the limitation by the first portion and/or the third portion, the position of the turbulence base in the accommodating cavity is not easy to change, thereby ensuring the stability of adjustment.

In some embodiments, the turbulence assembly further comprises a fixing member which penetrates and thus fixes the turbulence base and the turbulence stack block. By means of providing the fixing member, it is convenient for the turbulence base and other turbulence stack blocks mounted thereon to be fixed to each other, thereby ensuring the reliability of connection.

In some embodiments, the turbulence assembly comprises at least two fixing members, each of which penetrates the turbulence base and the turbulence stack block in a replaceable manner; and the end face of the fixing member is not beyond the end face of the turbulence base and the end face of the turbulence stack block. According to the above arrangement, the length of the fixing member may be selected according to the number of the turbulence stack blocks assembled on the turbulence base, which prevents the fixing member from being too long beyond the end face of the turbulence base and the end face of the turbulence stack block so as to reduce the interference of the fixing member on the flow of slurry, thereby improving the flow dividing effect of the turbulence assembly.

In some embodiments, the coating inlet directly faces the coating outlet; and one of the turbulence assemblies faces both the coating inlet and the coating outlet in the arrangement direction of the coating inlet and the coating outlet. By means of allowing one of the turbulence assemblies to face both the coating inlet and the coating outlet in the arrangement direction, the slurry flowing from the coating inlet to the flow channel may be equally distributed to two sides of the turbulence assembly in the coating width direction when flowing through the turbulence assembly, thereby improving the consistency of velocity.

In some embodiments, the coating inlet, the accommodating cavity and the coating outlet have first central axes coinciding with each other; and one of the turbulence assemblies has a second central axis coinciding with the first central axis. According to the above arrangement, the slurry flowing from the coating inlet to the flow channel may be more equally distributed to the two sides in the flow channel in the coating width direction, thereby improving the consistency of velocity.

In some embodiments, the flow channel is branched into at least two sub-flow channels at the turbulence assembly, and the at least two sub-flow channels converge upstream of the coating outlet.

In a second aspect, the present application provides a coating machine, comprising a coating die head as described in the above embodiments.

LIST OF REFERENCE SIGNS

Figure 1:
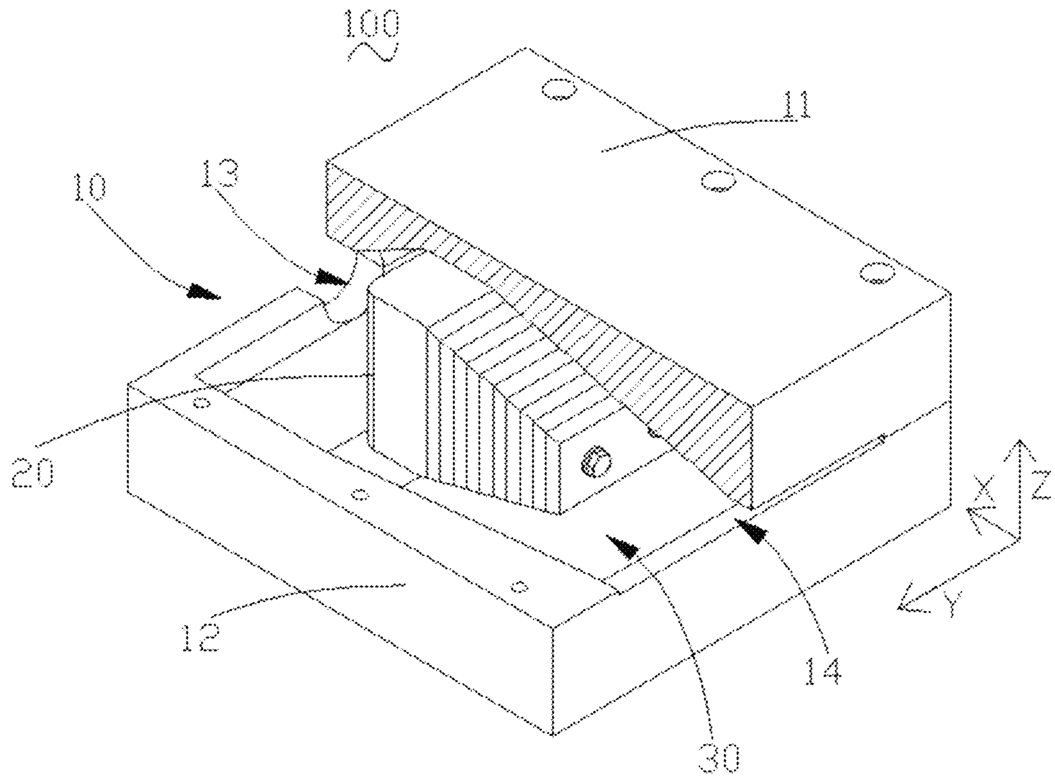
FIG. 1 is a partial cross-sectional view of a coating die head from one perspective according to an embodiment of the present application.

100. coating die head; 10. coating main body; 11. first die head; 111. first abutting face; 12. second die head; 121. second abutting face; 13. coating inlet; 14. coating outlet; 15. accommodating cavity; 151. first portion; 152. second portion; 153. third portion; 20. turbulence assembly; 21.

turbulence base; 211. groove; 22. turbulence stack block; 23. fixing member; 30. flow channel.

DETAILED DESCRIPTION OF EMBODIMENTS

In order to make the above objectives, features and advantages of the present application more clearly understood, particular embodiments of the present application will be described in detail below with reference to the accompanying drawings. In the following description, numerous specific details are set forth in order to provide a thorough understanding of the present application. However, the present application can be implemented in many other ways different from those described herein, and those skilled in the art can make similar improvements without departing from the essence of the present application. Therefore, the present application is not limited by the particular embodiments disclosed below.

In the description of the present application, it should be understood that the orientation or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or positional relationships shown in the accompanying drawings and are merely for ease of description of the present application and simplification of the description, rather than indicating or implying that the devices or elements referred to must have a specific orientation or be constructed and operated in a described orientation, and therefore cannot be construed as limiting the present application.

In addition, the terms "first" and "second" are used for descriptive purposes only, and cannot be construed as indicating or implying relative importance or implicitly indicating the number of technical features indicated. Therefore, the features defined with "first" and "second" may explicitly or implicitly include at least one of the features. In the description of the present application, the phrase "a plurality of" means at least two, such as two, three, etc., unless otherwise specifically defined.

In the present application, unless explicitly specified or defined otherwise, the terms such as "mounting", "connection", "connected" and "fixing" should be interpreted in a broad sense, for example, may be a fixed connection, a detachable connection, or integration; or may be a mechanical connection or an electrical connection; or may be a direct connection or an indirect connection via an intermediate medium, or may be communication between interiors of two elements or interaction between the two elements, unless otherwise specifically defined. For those of ordinary skills in the art, the specific meanings of the foregoing terms in the present application may be understood according to specific circumstances.

In the present application, unless otherwise explicitly specified and defined, the expression of a first feature being "on" or "under" a second feature may be the case that the first feature is in direct contact with the second feature, or the first feature is in indirect contact with the second feature via an intermediate medium. Moreover, the expression of the first feature being "over", "above" and "on top of" the second feature may be the case that the first feature is directly above or obliquely above the second feature, or only means that the level of the first feature is higher than the second feature. The expression of the first feature being "underneath", "below" and "beneath" the second feature may be the case that the first feature is directly below or obliquely below the second feature, or only means that the level of the first feature is lower than the second feature.

It should be noted that when an element is referred to as being "fixed to" or "arranged on" a further element, it may be directly on the further element, or there may be an intermediate element. When an element is referred to as being "connected" to a further element, it may be directly connected to the further element, or there may be an intermediate element. The terms "vertical", "horizontal", "upper", "lower", "left", "right" and similar expressions used herein are for illustrative purposes only but do not represent any unique implementation.

At present, from the development of the market situation, the application of traction batteries is increasingly extensive. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding.

In a preparation process of traction batteries, for example, lithium batteries, extrusion coating is generally used to prepare electrode plates (including positive plates and negative plates). Extrusion coating refers to a process of uniformly coating a current collector with a uniformly stirred slurry by means of extrusion through a slot and drying organic solvent in the slurry. A coating machine is needed for extrusion coating. The coating machine has a coating die head, which is provided with a coating inlet, a coating outlet, and an accommodating cavity in communication therebetween. During coating, the slurry enters the accommodating cavity from the coating inlet, passes through the accommodating cavity to reach the coating outlet, and is extruded from the coating outlet. However, the conventional coating devices cannot guarantee the consistency of extrusion velocity when different slurries are used, thus affecting the coating quality.

The inventors have noted that the root causes of the above problems lie in that different slurries are different in fluidity, that is, different slurries are different in viscosity, and in a coating process with high solid content, the slurry has larger viscosity and poorer fluidity, and has unstable flow properties and a wide range of fluctuation, so that when different slurries are used, the flow channel of only a single shape cannot meet the requirement on the consistency of extrusion velocity of each slurry in the coating width direction, thus affecting the coating quality. When the extrusion velocity is different, it is easy to cause the coating to crack, bulge and fail to form, thus affecting the product quality.

In order to alleviate the problem that the consistency of extrusion velocity cannot be guaranteed when different slurries are used, the applicant has found through research that it is possible to change the shape of the flow channel to allow the flow channels of different shapes to adapt to the slurries of different viscosities, so that the requirement on the consistency of extrusion velocity during production can be met when different slurries are used.

Based on the above considerations, in order to solve the problem that the consistency of extrusion velocity cannot be guaranteed when different slurries are used, the inventors have designed through research a coating die head, comprising a coating main body and a turbulence assembly. The coating main body comprises a first die head and a second die head arranged separately, the first die head and the second die head being spliced to form an accommodating cavity, and opposite ends of the coating main body being respectively provided with a coating inlet and a coating outlet which are in communication with the accommodating cavity.

The turbulence assembly defines a flow channel with a cavity wall of the accommodating cavity, and the turbulence assembly is adjustably arranged in the accommodating cavity.

In such a coating die head, since the turbulence assembly is adjustably arranged in the accommodating cavity, the flow channel defined by the turbulence assembly and the cavity wall of the accommodating cavity varies with the adjustment of the turbulence assembly in the accommodating cavity so as to meet the requirement for coating with slurries of different viscosities, so that when the coating die head is used for coating with slurries of different viscosities, it is possible to ensure the consistency of extrusion velocity of the slurries of different viscosities through the coating outlet in the coating width direction, thereby achieving the purpose of improving the product quality.

Figure 2:
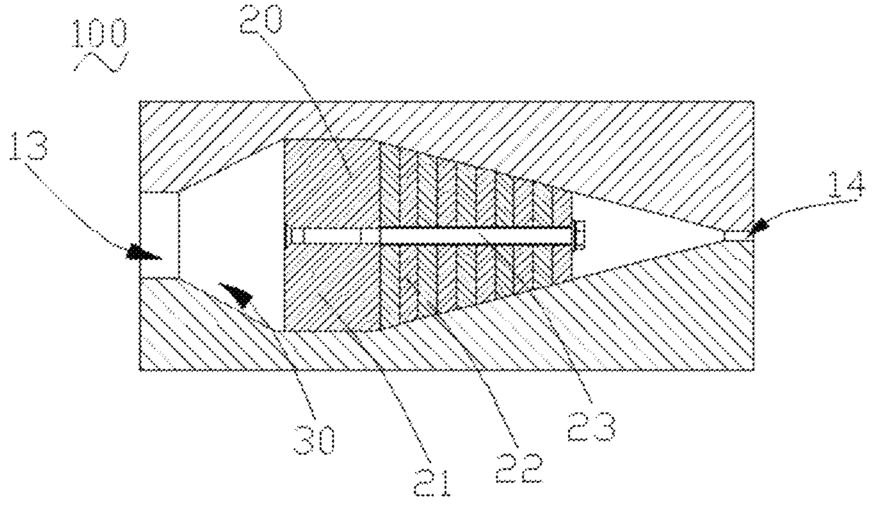
FIG. 2 is a cross-sectional view of the coating die head shown in FIG. 1 from another perspective.

Referring to FIGS. 1 and 2, the present application provides a coating die head 100, comprising a coating main body 10 and a turbulence assembly 20.

The coating main body 10 comprises a first die head 11 and a second die head 12 arranged separately, the first die head 11 and the second die head 12 being spliced to define an accommodating cavity 15 (referring to FIG. 3), and opposite ends of the coating main body 10 being respectively provided with a coating inlet 13 and a coating outlet 14, the coating inlet 13 and the coating outlet 14 being both in communication with the accommodating cavity 15.

The turbulence assembly 20 defines a flow channel 30 with a cavity wall of the accommodating cavity 15, and the turbulence assembly 20 is adjustably arranged in the accommodating cavity 15.

The coating main body 10 is the main portion of the coating die head 100 for coating. The first die head 11 and the second die head 12 being arranged separately means that the first die head 11 and the second die head 12 are of separable and independent structures, which is different from an inseparable integral arrangement.

The first die head 11 and the second die head 12 being spliced means that the first die head 11 and the second die head 12 can be connected together (or fitted together in a covering manner), with the surfaces thereof facing each other being at least partially attached. When the first die head 11 and the second die head 12 are connected together, the accommodating cavity 15 described above is formed between the first die head 11 and the second die head 12. Specifically, the first die head 11 is connected and fixed to the second die head 12 by means of a screw, which is convenient for the disassembly thereof.

The second die head 12 may be of a hollow structure with one end open, the first die head 11 may be of a plate-like structure, and the first die head 11 covers an open side of the second die head 12, such that the first die head 11 and the second die head 12 jointly define the accommodating cavity 15. The first die head 11 and the second die head 12 may also each be of a hollow structure with one end open, with an open side of the first die head 11 covering an open side of the second die head 12. Of course, the coating main body 10 formed by the first die head 11 and the second die head 12 may be in various shapes, such as a cuboid or other irregular shapes.

The accommodating cavity 15 is a cavity that can accommodate other components and slurries. The coating inlet 13 serves as an inlet through which the slurry enters the accommodating cavity 15, and the coating outlet 14 serves as an outlet through which the slurry is extruded from the accommodating cavity 15. That is, during coating, the slurry is extruded into the accommodating cavity 15 through the coating inlet 13, and is extruded to the coating outlet 14 through the accommodating cavity 15 and then extruded out. The size of the coating outlet 14 in the coating width direction is generally several times or even dozens of times that of the coating inlet 13. In a specific embodiment, the size of the coating outlet 14 in the coating width direction is 5-6 times that of the coating inlet 13. The coating width direction intersects the arrangement direction of the coating inlet 13 and the coating outlet 14.

In an embodiment, both the coating inlet 13 and the coating outlet 14 are formed between the first die head 11 and the second die head 12. Of course, in other embodiments, the coating inlet 13 and coating outlet 14 may also be formed in the first die head 11 or in the second die head 12, which is not limited herein.

The flow channel 30 is a channel, which is used for coating with the slurry, defined by the turbulence assembly 20 arranged in the accommodating cavity 15 and the cavity wall of the accommodating cavity 15.

The expression "the turbulence assembly 20 defines a flow channel 30 with a cavity wall of the accommodating cavity 15, and the turbulence assembly 20 is adjustably arranged in the accommodating cavity 15" means that a flow channel 30 through which the slurry passes can be formed between the turbulence assembly 20 and the cavity wall of the accommodating cavity 15, and the turbulence assembly 20 is adjustably arranged in the accommodating cavity 15, such that the turbulence assembly 20 and the cavity wall of the accommodating cavity 15 define different flow channels.

It should be noted herein that the slurry is a slurry with a high solid content, generally referring to a slurry with a solid content greater than 70%. Solid content is the mass percentage of the remaining of an emulsion or a slurry after drying under specified conditions.

The above arrangement direction is perpendicular to the coating width direction. Referring to FIG. 1, the arrangement direction is X-direction in FIG. 1, and the coating width direction is Y-direction in FIG. 1.

According to the above arrangement, since the turbulence assembly 20 is adjustably arranged in the accommodating cavity 15, the flow channel 30 defined by the turbulence assembly 20 and the cavity wall of the accommodating cavity 15 varies with the adjustment of the turbulence assembly 20 in the accommodating cavity 15 so as to meet the requirement for coating with slurries of different viscosities. That is, when it is necessary to coat with a slurry of a different viscosity, the turbulence assembly 20 is adjusted to change the flow channel 30 to match the changed flow channel 30 with the viscosity of the slurry, such that the flow resistance of the slurry in the flow channel 30 is adjusted to adjust the distribution of extrusion velocity and thus ensure the consistency of extrusion velocity of the slurries of different viscosities in the coating width direction through the coating outlet 14, thereby achieving the purpose of improving the product quality.

It should be noted herein that the expression of the extrusion velocity at the coating outlet 14 in the coating width direction being the same means that during coating with any slurry, the slurry is extruded at the same velocity from all parts of the coating outlet 14 in the coating width direction, that is, the mass of the slurry extruded from all parts of the coating outlet 14 per unit length and at the same time in the coating width direction is the same.

According to some embodiments of the present application, optionally, the turbulence assembly 20 has adjustable volume, shape and/or position; and/or the turbulence assembly 20 is arranged in the accommodating cavity 15 in a replaceable manner.

The expression "the turbulence assembly 20 has an adjustable volume" means that the flow channel 30 can be adjusted by means of adjusting the volume of the turbulence assembly 20 arranged in the accommodating cavity 15.

The expression "the turbulence assembly 20 has an adjustable shape" means that the flow channel 30 can be adjusted by means of adjusting the shape of the turbulence assembly 20 arranged in the accommodating cavity 15.

The expression "the turbulence assembly 20 has an adjustable position" means that the flow channel 30 can be adjusted by means of adjusting the position of the turbulence assembly 20 arranged in the accommodating cavity 15.

The expression "the turbulence assembly 20 is arranged in the accommodating cavity 15 in a replaceable manner" means replacing with a different turbulence assembly 20 in the accommodating cavity 15, for example, replacing with different number of turbulence assemblies 20 in the accommodating cavity 15.

By means of adjusting the volume, shape and/or position of the turbulence assembly 20 and/or allowing the turbulence assembly 20 to be arranged in the accommodating cavity 15 in a replaceable manner, the turbulence assembly 20 defines different flow channels 30 with the cavity wall of the accommodating cavity 15 so as to meet the requirement for coating with slurries of different viscosities.

According to some embodiments of the present application, optionally, the turbulence assembly 20 comprises at least one turbulence member, which is arranged in the accommodating cavity 15 in such a manner that the number of the turbulence member in the turbulence assembly 20 is adjustable and/or the turbulence member has a variable shape and/or an adjustable position.

The turbulence member is a constituent part of the turbulence assembly 20, and the turbulence assembly 20 comprises at least one turbulence member.

By means of changing the number and/or shape of the turbulence member in the turbulence assembly 20 and/or adjusting the position of the turbulence member, it is convenient for defining different flow channels 30 with the cavity wall of the accommodating cavity 15, thereby ensuring the uniform extrusion velocity during coating with slurries of different viscosities.

Figure 4:
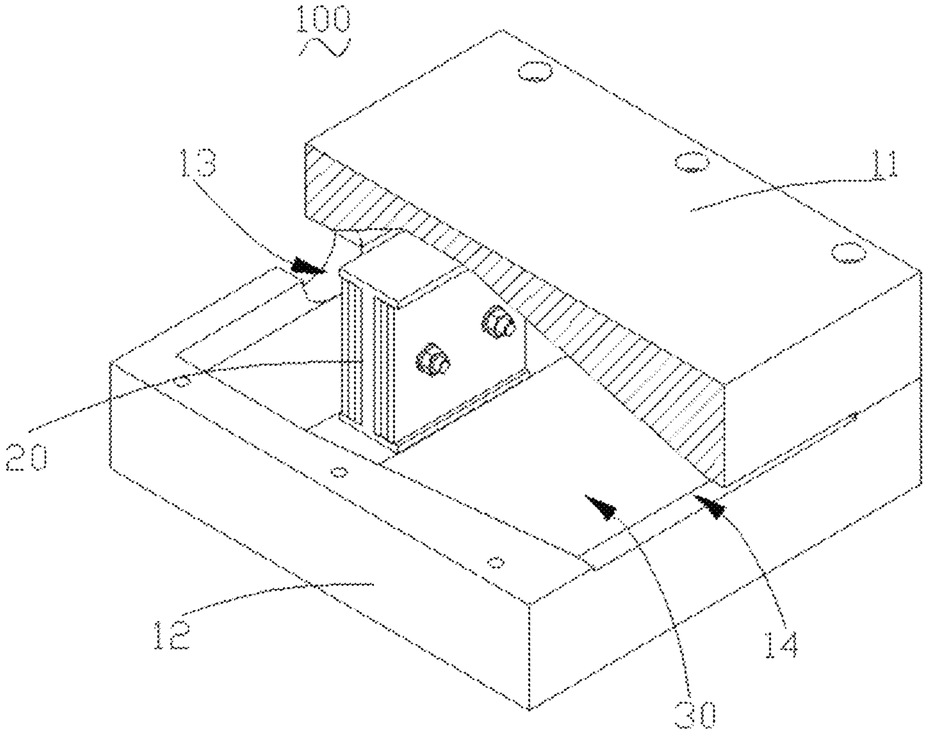
FIG. 4 is a partial cross-sectional view of a coating die head from one perspective according to another embodiment of the present application.
Figure 5:
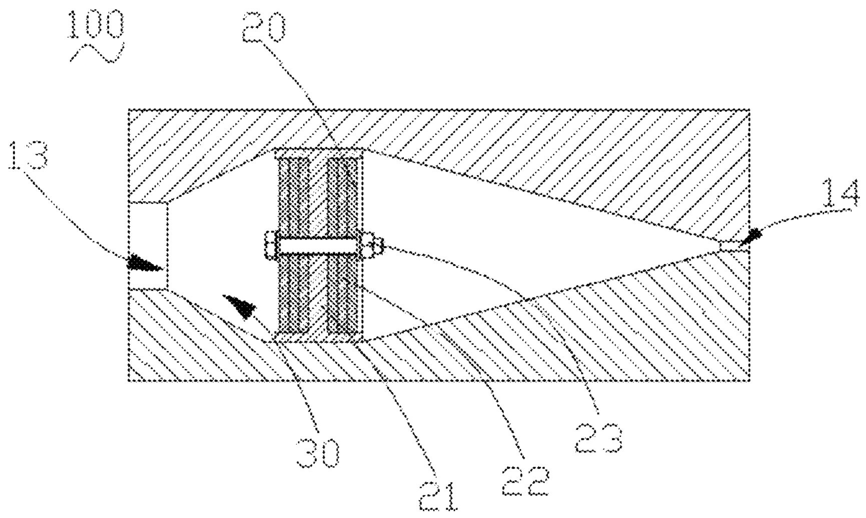
FIG. 5 is a cross-sectional view of the coating die head shown in FIG. 4 from another perspective.

According to some embodiments of the present application, optionally, referring to FIGS. 4 and 5, each turbulence assembly 20 comprises at least two turbulence members, each of which comprises a turbulence base 21 and at least one turbulence stack block 22, the turbulence base 21 being fixed in the accommodating cavity 15, and the turbulence stack block 22 being detachably connected to the turbulence base 21.

The turbulence base 21 is also a turbulence member, which generally has a greater size than the other turbulence members and thus serves as a fixing foundation that allows for the other turbulence members to be fixed in the accommodating cavity 15. That is, when the shape of the flow channel 30 is adjusted, the turbulence base 21 of at least one of the turbulence assemblies 20 is always arranged in the accommodating cavity 15, and the shape of the flow channel 30 is adjusted by means of changing the number of the other turbulence members (the turbulence stack blocks 22) in the turbulence assembly.

By means of allowing one turbulence member in each turbulence assembly 20 to serve as the turbulence base 21, it is convenient for the turbulence assembly 20 to be fixed in the accommodating cavity 15 and thus prevented from moving in the accommodating cavity 15 under the pressure from the slurry during the slurry extrusion process, thereby further ensuring the consistency of extrusion velocity.

According to some embodiments of the present application, optionally, the turbulence stack blocks 22 are detachably connected to the turbulence base 21, and at least some of the turbulence stack blocks 22 are located upstream and/or downstream of the turbulence base 22 in a slurry movement direction.

The expression "at least some of the turbulence stack blocks 22 are located upstream and/or downstream of the turbulence base 22" means that when the other turbulence members that do not serve as the turbulence base 21 need to be fixedly arranged in the accommodating cavity 15, the turbulence members may be arranged on one side of the turbulence base 21 in the above arrangement direction or on any side thereof. If the side of the turbulence base 21 close to the coating inlet 13 is defined as a first side, and the side close the coating outlet 14 is defined as a second side, all the remaining turbulence members may be stacked on the first side or tacked on the second side, or some of the turbulence members may be stacked on the first side, with the remaining stacked on the second side.

Based on the results of hydrodynamic analysis, it can be seen that the turbulence member has a great influence on the consistency of extrusion velocity of the slurry from the coating outlet 14 in the arrangement direction (in a length direction of the coating die head 100). By means of allowing at least some of the turbulence stack blocks 22 to be located upstream and/or downstream of the turbulence base 21 in the slurry movement direction, it is convenient to adjust the length of the turbulence assembly 20 in the arrangement direction, thereby ensuring the consistency of extrusion velocity.

Figure 6:
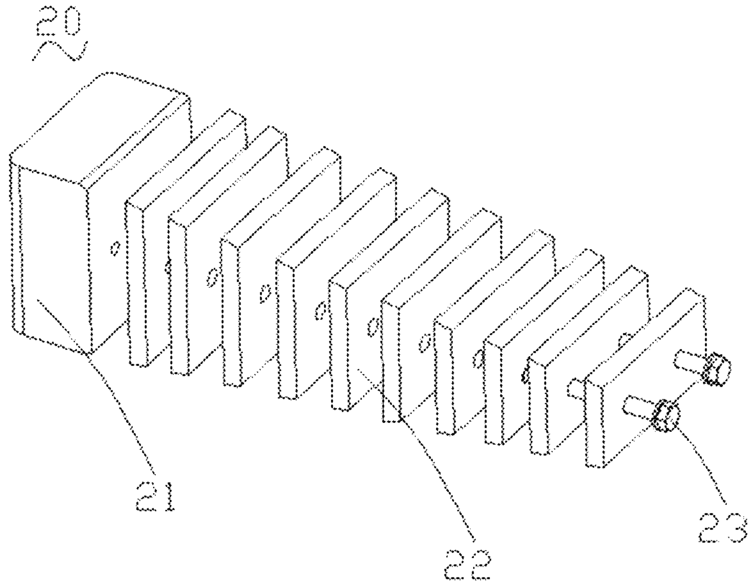
FIG. 6 is an exploded view of a turbulence assembly of the coating die head shown in FIG. 1.

According to some embodiments of the present application, optionally, referring to FIG. 6, the turbulence base 21 is of a cuboid block structure. In this way, it is convenient for the arrangement of the turbulence base 21.

Figure 7:
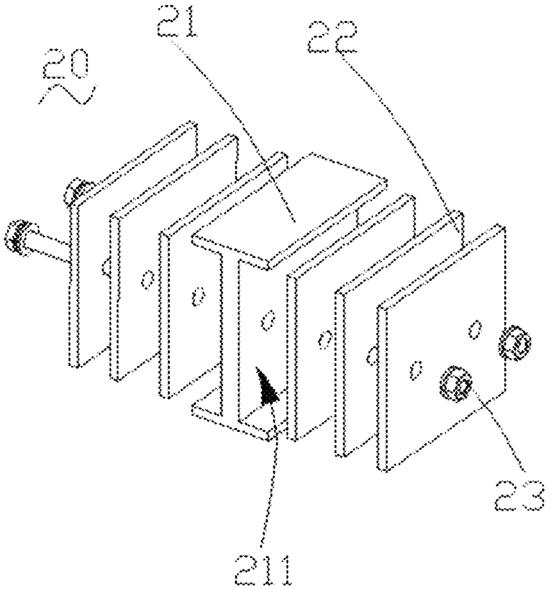
FIG. 7 is an exploded view of a turbulence assembly of the coating die head shown in FIG. 4.

According to some embodiments of the present application, optionally, referring to FIG. 7, the turbulence base 21 is of an I-shaped structure having two grooves 211 for accommodating the turbulence stack blocks 22, the two grooves 211 respectively facing the coating inlet 13 and the coating outlet 14.

The expression "the two grooves 211 respectively facing the coating inlet 13 and the coating outlet 14" means that the two grooves 311 are respectively located on two sides of the turbulence base 21 in the above arrangement direction.

In the case where the turbulence base 21 is of an I-shaped structure, a web (a vertical plate that connects an upper horizontal plate and a lower horizontal plate) in the I-shaped structure has a small size in the arrangement direction, and the turbulence stack blocks 22 can be accommodated in the grooves 211 on the two sides of the I-shaped structure, so that more turbulence stack blocks 22 can be provided in the arrangement direction, thereby expanding the range of adjustment in the arrangement direction.

It can be understood that in other embodiments, the shape of the turbulence base 21 may be selected as needed, which is not limited herein.

According to some embodiments of the present application, optionally, the turbulence stack block 22 is of a sheet structure. The turbulence stack block 22 being in a sheet shape reduces the thickness of each turbulence stack block 22 in the arrangement direction, thereby improving the precision of adjustment in the arrangement direction. The specific thickness of the turbulence stack block 22 in the arrangement direction is determined according to working conditions.

According to some embodiments of the present application, optionally, referring to FIGS. 2 and 5, the turbulence base 21 abuts between the first die head 11 and the second die head 12 and is fixed. Specifically, the turbulence base 21 abuts between the first die head 11 and the second die head 12 in a first direction and is fixed. The arrangement direction, the first direction and the coating width direction are perpendicular to each other. The first direction is Z-direction in FIG. 1.

Abutting means that the two components are in contact against each other. The expression "the turbulence base 21 abuts between the first die head 11 and the second die head 12 in a first direction" means that two ends of the turbulence base 21 in the first direction respectively abut with the first die head 11 and the second die head 12, and the turbulence base 21 is fixed under the abutting action of the first die head 11 and the second die head 12, that is, the turbulence base 21 is clamped and fixed between the first die head 11 and the second die head 12.

According to the above arrangement, the turbulence base 21 can be fixed in the accommodating cavity 15 under the abutting action of the first die head 11 and the second die head 12, which omits the arrangement of additional components to fix the turbulence base 21 in the accommodating cavity 15, so as to prevent the interference on the flow of slurry due to the arrangement of additional components in the accommodating cavity 15 while simplifying the structure of the coating die head 100.

Of course, in other embodiments, the turbulence base 21 may also be fixed by means of another component, for example, auxiliary fixation with a positioning pin, which is not limited herein.

Figure 3:
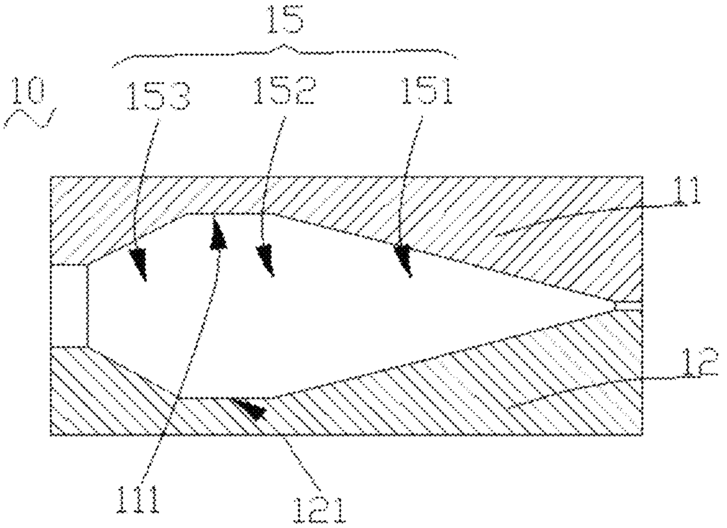
FIG. 3 is a cross-sectional view of a coating main body of the coating die head shown in FIG. 1.

According to some embodiments of the present application, optionally, referring to FIG. 3, the first die head 11 has a first abutting face 111, and the second die head 12 has a second abutting face 121, the first abutting face 111 being spaced apart from and facing the second abutting face 121 in the first direction. The first abutting face 111 and the second abutting face 121 respectively abut with two end faces of the turbulence base 21 in the first direction.

Further, the first abutting face 111 and the second abutting face 121 are both a flat surface, and the first abutting face 111 and the second abutting face 121 respectively abut with flat surfaces of two ends of the turbulence base 21 in the first direction.

Abutting with flat surfaces means that the two end faces of the turbulence base 21 in the arrangement direction are flat surfaces, with one of the end faces abutting with the first abutting face 111, and the other end face abutting with the second abutting face 121.

Since the first abutting face 111 and the second abutting face 121 respectively abut with the two end faces of the turbulence base 21 in the first direction, it is ensured that there is no gap between the two end faces of the turbulence base 21 in the first direction and the die heads, so that the slurry can flow to the coating outlet 14 only from two sides of the turbulence base 21 in the coating width direction, which enhances the flow blocking and dividing functions of the turbulence member.

According to some embodiments of the present application, optionally, the accommodating cavity 15 comprises a first portion 151 and a second portion 152 which are in communication with each other, the second portion 152 being in communication with the coating inlet 13, the first portion 151 being in communication with the coating outlet 14, the height of the first portion 151 gradually decreasing from the end in communication with the second portion 152 to the other end, and the turbulence base 21 being fixed in the second portion 152.

The height direction of the coating die head 100 intersects both the above coating direction and arrangement direction.

With the arrangement in which the accommodating cavity 15 is configured to have the first portion 151 and the second portion 152 which are in communication with each other, and the turbulence base 21 is fixed in the second portion 152, due to the limitation by the first portion 151, the position of the turbulence base 21 in the accommodating cavity 15 is not easy to change, thereby ensuring the stability of adjustment.

According to some embodiments of the present application, optionally, the accommodating cavity 15 comprises a second portion 152 and a third portion 153 which are in communication with each other, the third portion 153 being in communication with the coating inlet 13, the second portion 152 being in communication with the coating outlet 14, the height of the third portion 153 gradually decreasing from the end in communication with the second portion 152 to the other end, and the turbulence base being fixedly arranged in the second portion 152.

With the arrangement in which the accommodating cavity 15 is configured to have the second portion 152 and the third portion 153 which are in communication with each other, and the turbulence base 21 is fixed in the second portion 152, due to the limitation by the third portion 153, the position of the turbulence base 21 in the accommodating cavity 15 is not easy to change, thereby ensuring the stability of adjustment.

According to some embodiments of the present application, optionally, the accommodating cavity 15 comprises a first portion 151, a second portion 152 and a third portion 153 which are in communication in sequence, the third portion 153 being in communication with the coating inlet 13, the first portion 151 being in communication with the coating outlet 14, the size of the third portion 153 gradually decreasing from the end in communication with the second portion 152 to the other end, the size of the first portion 151 gradually decreasing from the end in communication with the second portion 152 to the other end, and the turbulence base 21 being fixed in the second portion 152.

With the arrangement in which the accommodating cavity 15 is configured to have the first portion 151, the second portion 152 and the third portion 153 which are in communication with each other, and the turbulence base 21 is fixed in the second portion 152, due to the limitation by the first portion 151 and the third portion 153, the position of the turbulence base 21 in the accommodating cavity 15 is not easy to change, thereby ensuring the stability of adjustment.

It should be noted herein that the shapes of the turbulence members arranged in the first portion 151, the second portion 152 and the third portion 153 are adaptively adjusted depending on the shapes of the three portions and can thus be accommodated in the first portion 151, the second portion 152 or the third portion 153.

According to some embodiments of the present application, optionally, referring to FIGS. 6 and 7, the turbulence assembly 20 further comprises a fixing member 23, the fixing member 23 penetrating and thus fixing the turbulence base 21 and the turbulence stack block 22.

The fixing member 23 comprises a screw and a nut that matches the screw, the screw penetrating the turbulence base 21 and the turbulence stack block 22, and the nut being arranged at a penetrating end of the screw to fix the turbulence base 21 and the turbulence stack block 22 mounted on the turbulence base 21. Specifically, a threaded through hole is formed in the turbulence base 21 in a penetrating manner in the arrangement direction, and in the case where no turbulence stack block 22 is stacked on one side of the turbulence base 21 in the arrangement direction, the threaded through hole is plugged with a countersunk screw. Moreover, the turbulence base 21 being machined to form the threaded through hole is equivalent to the case of machining to form a blind hole, which is convenient for cleaning.

In other embodiments, the turbulence base 21 and other turbulence stack blocks 22 may also be connected and fixed in other ways, such as clamping.

By means of providing the fixing member 23, it is convenient for the turbulence base 21 and the other turbulence stack blocks 22 mounted thereon to be fixed to each other, thereby ensuring the reliability of connection.

According to some embodiments of the present application, optionally, the turbulence assembly 20 comprises at least two fixing members 23, the fixing members 23 selectively penetrating the turbulence base 21 and the turbulence stack block 22. The end faces of the fixing members 23 are not beyond the end face of the turbulence base 21 and the end face of the turbulence stack block 22.

The expression "the end faces of the fixing members 23 are not beyond the end face of the turbulence base 21 and the end face of the turbulence stack block 22" means that the two end faces of the fixing member 23 in the arrangement direction are flush with the turbulence base 21 or the turbulence stack block 22, or the two end faces of the fixing member 23 in the arrangement direction are recessed in the turbulence base 21 or the turbulence stack block 22.

According to the above arrangement, the length of the selected fixing member 23 may be selected according to the number of the turbulence stack blocks 22 assembled on the turbulence base 21, which prevents the fixing member 23 from being too long beyond the end face of the turbulence base 21 and the end face of the turbulence stack block 22 so as to reduce the interference of the fixing member 23 on the flow of slurry, thereby improving the flow dividing effect of the turbulence assembly 20.

It should be understood that in other embodiments, each turbulence assembly 20 may only comprise one fixing member 23, and when each turbulence assembly 20 has different number of turbulence stack blocks 22 arranged in the accommodating cavity 15, there will be a case where the fixing member 23 is beyond the end face of the turbulence base 21 and the end face of the turbulence stack block 22 mounted thereon.

Figure 8:
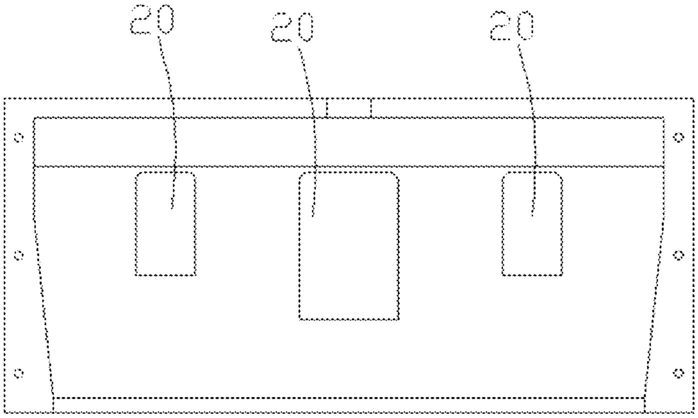
FIG. 8 is a partial structural view of a coating die head according to yet another embodiment of the present application.

According to some embodiments of the present application, optionally, referring to FIGS. 1, 4 and 8, the coating inlet 13 directly faces the coating outlet 14 in the arrangement direction. One of the turbulence assemblies 20 faces both the coating inlet 13 and the coating outlet 14 in the arrangement direction.

The expression "the coating inlet 13 directly faces the coating outlet 14 in the arrangement direction" means that the projection of the coating inlet 13 on the plane where the coating outlet 14 is located at least partially coincides with the coating outlet 14 in the coating width direction. The expression "one of the turbulence assemblies 20 faces both the coating inlet 13 and the coating outlet 14 in the arrangement direction" means that the projection of one of the turbulence assemblies 20 on the plane where the coating outlet 14 is located, the projection of the coating inlet 13 on the plane where the coating outlet 14 is located, and the coating outlet 14 at least partially coincide in the coating width direction.

By means of allowing one of the turbulence assemblies 20 to face both the coating inlet 13 and the coating outlet 14 in the arrangement direction, the slurry flowing from the coating inlet 13 to the flow channel 30 may be equally distributed to two sides of the turbulence assembly 20 in the coating width direction when flowing therethrough, thereby improving the consistency of velocity.

According to some embodiments of the present application, optionally, referring to FIG. 8, the coating inlet 13, the accommodating cavity 15 and the coating outlet 14 have first central axes coinciding with each other.

One of the turbulence assemblies 20 has a second central axis coinciding with the first central axis. That is, the coating inlet 13, the accommodating cavity 15 and the coating outlet 14 are all axisymmetric, each have a first central axis, and have the first central axes thereof coinciding with each other. The turbulence assembly 20 is also centrosymmetric and has a second central axis, and has the first central axis thereof coinciding with the second central axis.

According to the above arrangement, the slurry flowing from the coating inlet 13 to the flow channel 30 may be more equally distributed in the flow channel 30 to the two sides in the coating width direction, thereby improving the consistency of velocity.

It should be noted herein that the above description only limits the arrangement of one turbulence assembly 20 provided in the accommodating cavity 15, and the arrangement of the other turbulence assemblies 20 is determined as needed. For example, in the case where the coating inlet 13, the accommodating cavity 15 and the coating outlet 14 are all axisymmetric, the other turbulence assemblies 20 may be symmetrically located in the coating width direction on two sides of the above turbulence assembly 20.

According to some embodiments of the present application, optionally, the flow channel 30 is branched into at least two sub-flow channels at the turbulence assembly 20, and the at least two sub-flow channels converge upstream of the coating outlet 14.

In the case where no turbulence assembly 20 is provided in the accommodating cavity 15, the accommodating cavity 15 forms the flow channel 30. However, in the case where the turbulence assembly 20 is provided in the accommodating cavity 15, the flow channel 30 is defined by the cavity wall of the accommodating cavity 15 and the turbulence assembly 20 together.

The expression "the flow channel 30 is branched into at least two sub-flow channels at the turbulence assembly 20, and the at least two sub-flow channels converge upstream of the coating outlet 14" means that in the case where one turbulence assembly 20 is provided in the accommodating cavity 15, the part of the flow channel 30 in communication with the coating inlet 13 is branched into two sub-flow channels at the turbulence assembly 20, and the two sub-flow channels converge upstream of the coating outlet 14. However, in the case where more than one turbulence assembly 20 is provided in the accommodating cavity 15, the part of the flow channel 30 in communication with the coating inlet 13 is branched into at least two sub-flow channels at the turbulence assemblies and the at least two sub-flow channels converge upstream of the coating outlet 14.

The above arrangement prevents interference of the turbulence assemblies 20 on the flow of slurry from the flow channel 30 to the coating outlet 14 while ensuring that the turbulence assemblies 20 define different flow channels 30 with the cavity wall of the accommodating cavity 15, which is convenient for coating.

According to some embodiments of the present application, the present application further provides a coating machine, comprising a coating die heads 100 as described in any one of the above aspects.

According to some embodiments of the present application, referring to FIGS. 1 and 2, the present application provides a coating die head 100, the coating die head 100 comprising a coating main body 10 and one turbulence assembly 20. The coating main body 10 comprises a first die head 11 and a second die head 12, the first die head 11 and the second die head 12 being spliced to form the coating main body 10 of a cuboid block structure. A coating inlet 13, an accommodating cavity 15 and a coating outlet 14 are formed between the first die head 11 and the second die head 12. In an arrangement direction, the coating inlet 13 directly faces the coating outlet 14, and the turbulence assembly 20 faces both the coating inlet 13 and the coating outlet 14.

The turbulence assembly 20 comprises a turbulence base 21 in the shape of a cuboid block and a plurality of turbulence stack blocks 22, the turbulence base 21 having a larger size in the arrangement direction than each turbulence stack block 22, and all the turbulence stack blocks 22 having the same size in the arrangement direction. Specifically, the accommodating cavity 15 comprises a third portion 153, a second portion 152 and a first portion 151 which are in communication in sequence in the arrangement direction. A first abutting face 111 and a second abutting face 121 are formed in the second part 152, and two ends of the turbulence base 21 in the first direction respectively abut with the first abutting face 111 and the second abutting face 121. The turbulence stack block 22 is arranged on the side of the turbulence base 21 close to the coating outlet 14 in the arrangement direction, and by means of changing the number of the turbulence stack blocks 22 stacked on the turbulence base 21, the flow channel 30 is changed to match the viscosity of the slurry, such that the flow resistance of the slurry in the flow channel 30 is adjusted to adjust the distribution of extrusion velocity and thus ensure the consistency of extrusion velocity of the slurries of different viscosities in the coating width direction through the coating outlet 14, thereby achieving the purpose of improving the product quality.

According to other embodiments of the present application, referring to FIGS. 4 and 5, the present application provides a coating die head 100, which differs from the foregoing embodiments in that the turbulence base 21 is I-shaped, and the turbulence stack blocks 22 are arranged in the grooves 211 of the turbulence base 21. By means of changing the number of the turbulence stack blocks 22 stacked on the turbulence base 21, the flow channel 30 is changed to match the viscosity of the slurry, such that the flow resistance of the slurry in the flow channel 30 is adjusted to adjust the distribution of extrusion velocity and thus ensure the consistency of extrusion velocity of the slurries of different viscosities in the coating width direction through the coating outlet 14, thereby achieving the purpose of improving the product quality.

The various technical features of the above embodiments can be combined in any manner, and in order to simplify the description, not all possible combinations of the various technical features of the above embodiments are described. However, as long as there is no conflict between the combinations of these technical features, they should be considered to be within the scope of the description in the present application.

The embodiments described above merely illustrate several implementations of the present application, and the description thereof is relatively specific and detailed, but it should not be construed as limiting the patent scope of the present application. It should be noted that several variations and improvements may also be made by those of ordinary skill in the art without departing from the concept of the present application, and should fall within the scope of protection of the present application. Therefore, the scope of protection of the present application shall be defined by the appended claims.

The invention claimed is:

1. A coating die head, comprising:

a coating main body comprising a first die head and a second die head arranged separately, the first die head and the second die head being spliced to define an accommodating cavity, and opposite ends of the coating main body being respectively provided with a coating inlet and a coating outlet which are in communication with the accommodating cavity; and a turbulence assembly which defines a flow channel with a cavity wall of the accommodating cavity, the turbulence assembly being adjustably arranged in the accommodating cavity, wherein the turbulence assembly comprises at least one turbulence structure, which is arranged in the accommodating cavity in such a manner that the number of the at least one turbulence structure in the turbulence assembly is adjustable and/or the at least one turbulence structure each has a variable shape and/or an adjustable position; and wherein the at least one turbulence structure comprises two or more turbulence structures; and the two or more turbulence structures comprise a turbulence base and at least one turbulence stack block, the turbulence base being fixed in the accommodating cavity, and the at least one turbulence stack block being detachably connected to the turbulence base, wherein the at least one turbulence stack block comprises a plurality of turbulence stack blocks, which are detachably connected to the turbulence base, and at least some of the plurality of turbulence stack blocks are located upstream and/or downstream of the turbulence base in a slurry movement direction.

2. The coating die head according to claim 1, wherein the turbulence assembly has adjustable volume, shape and/or position; and/or the turbulence assembly is arranged in the accommodating cavity in a replaceable manner.

3. The coating die head according to claim 1, wherein the turbulence base is of an I-shaped structure having two grooves for accommodating the turbulence stack blocks, the two grooves respectively facing the coating inlet and the coating outlet.

4. The coating die head according to claim 1, wherein the turbulence base abuts between the first die head and the second die head and is fixed.

5. The coating die head according to claim 4, wherein the first die head has a first abutting face, and the second die head has a second abutting face spaced apart from the first abutting face; and the first abutting face and the second abutting face respectively abut with two end faces of the turbulence base.

6. The coating die head according to claim 1, wherein the accommodating cavity comprises a first portion and a second portion which are in communication with each other, the second portion being in communication with the coating inlet, the first portion being in communication with the coating outlet, the height of the first portion gradually decreasing from the end in communication with the second portion to the other end, and the turbulence base being fixed in the second portion; and/or the accommodating cavity comprises a second portion and a third portion which are in communication with each other, the third portion being in communication with the coating inlet, the second portion being in communication with the coating outlet, the height of the third portion gradually decreasing from the end in communication with the second portion to the other end, and the turbulence base being fixedly arranged in the second portion.

7. The coating die head according to claim 1, wherein the turbulence assembly further comprises a fixing structure, the fixing structure penetrating and thus fixing the turbulence base and the at least one turbulence stack block.

8. The coating die head according to claim 7, wherein the turbulence assembly comprises at least two fixing structures members, each of the fixing structures penetrating the turbulence base and the at least one turbulence stack block in a replaceable manner; and an end face of the fixing structure is not beyond an end face of the turbulence base and an end face of the at least one turbulence stack block.

9. The coating die head according to claim 1, wherein the coating inlet directly faces the coating outlet; and turbulence assemblies are provided, and one of the turbulence assemblies faces both the coating inlet and the coating outlet in the arrangement direction of the coating inlet and the coating outlet.

10. The coating die head according to claim 9, wherein the coating inlet, the accommodating cavity and the coating outlet have first central axes coinciding with each other; and one of the turbulence assemblies has a second central axis coinciding with the first central axis.

11. The coating die head according to claim 1, wherein the flow channel is branched into at least two sub-flow channels at the turbulence assembly, and the at least two sub-flow channels converge upstream of the coating outlet.

12. A coating machine, comprising a coating die head of claim 1.

* * * * *